(12) United States Patent
Sulser et al.

(10) Patent No.: US 10,040,472 B2
(45) Date of Patent: Aug. 7, 2018

(54) STEERING COLUMN FOR A MOTOR VEHICLE

(71) Applicants: ThyssenKrupp Presta AG, Eschen (LI); ThyssenKrupp AG, Essen (DE)

(72) Inventors: Hansjörg Sulser, Gamprin (LI); Sebastian Forte, Mauren (LI); Richard Wiebe, Vaduz (LI); Mathias Senn, Grabs (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/311,652

(22) PCT Filed: Apr. 24, 2015

(86) PCT No.: PCT/EP2015/058953
§ 371 (c)(1),
(2) Date: Nov. 16, 2016

(87) PCT Pub. No.: WO2015/176914
PCT Pub. Date: Nov. 26, 2015

(65) Prior Publication Data
US 2017/0096159 A1    Apr. 6, 2017

(30) Foreign Application Priority Data
May 23, 2014 (DE) .................. 10 2014 107 292

(51) Int. Cl.
*B62D 1/16* (2006.01)
*F16C 19/06* (2006.01)
*F16C 35/067* (2006.01)

(52) U.S. Cl.
CPC .............. *B62D 1/16* (2013.01); *F16C 19/06* (2013.01); *F16C 35/067* (2013.01); *F16C 2326/24* (2013.01)

(58) Field of Classification Search
CPC .......... B62D 1/16; F16C 19/06; F16C 35/067; F16C 2326/24
See application file for complete search history.

(56) References Cited

U.S. PATENT DOCUMENTS

| | | | |
|---|---|---|---|
| 4,287,786 A * | 9/1981 | Berginski | B60R 25/02105 70/252 |
| 6,179,473 B1 * | 1/2001 | Ponson | B62D 1/16 384/517 |

(Continued)

FOREIGN PATENT DOCUMENTS

| | | |
|---|---|---|
| CN | 200977941 Y | 11/2007 |
| CN | 202046353 U | 11/2011 |

(Continued)

OTHER PUBLICATIONS

DIN 472; "Retaining rings for bores—Normal type and heavy type English translation of DIN 472:2011-10;" Oct. 2011, pp. 1-23; DIN Deutsches Institut für Normung e.V., Berlin, Germany.

(Continued)

*Primary Examiner* — Drew J Brown
(74) *Attorney, Agent, or Firm* — thyssenkrupp North America, Inc.

(57) ABSTRACT

A steering column for a motor vehicle may comprise a steering column jacket with a jacket surface having a retaining segment. The retaining segment may at least partially surround a bearing for rotatably mounting a steering spindle about an axis of rotation. The retaining segment may have at least one tab that secures the bearing in the steering column jacket in a direction of the axis of rotation. The tab may be connected to the retaining segment of the steering column jacket along a bending edge. The bending edge may form a projection angle of at maximum 45° with a projected axis of rotation. The free end of the tab is bent around the bending edge towards the axis of rotation.

16 Claims, 3 Drawing Sheets

(56) References Cited

U.S. PATENT DOCUMENTS

| | | | |
|---|---|---|---|
| 6,474,875 B1 | 11/2002 | Waseda et al. | |
| 2002/0181814 A1* | 12/2002 | Beauprez | G01P 3/443 384/448 |
| 2002/0181815 A1* | 12/2002 | Beauprez | B62D 1/16 384/448 |
| 2003/0154815 A1* | 8/2003 | Heiml | B21C 37/0803 74/492 |
| 2004/0055408 A1* | 3/2004 | Hirschfeld | B62D 1/10 74/492 |
| 2015/0057091 A1* | 2/2015 | Simon | B62D 1/16 464/167 |
| 2017/0080968 A1* | 3/2017 | Frenzel | B62D 1/16 |
| 2017/0096159 A1* | 4/2017 | Sulser | B62D 1/16 |

FOREIGN PATENT DOCUMENTS

| | | | |
|---|---|---|---|
| DE | 19860345 A1 | 7/2000 |
| DE | 69902610 T2 | 8/2003 |
| EP | 1394426 A2 | 3/2004 |
| EP | 2150714 A1 | 2/2010 |
| FR | 2921327 A1 | 3/2009 |
| JP | H11342853 A | 12/1999 |
| JP | 2008260375 A | 10/2008 |
| JP | 2014051181 A | 3/2014 |
| WO | 2008/113437 A1 | 9/2008 |

OTHER PUBLICATIONS

Int'l Search Report for PCT/EP2015/058953 dated Sep. 4, 2015 (mailed Sep. 14, 2015).
DIN 472.
English Language Abstract for DE69902610T2.
Chinese Office Action issued in corresponding application No. CN201580025983.7, dated May 3, 2018. [English translation unavailable].

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2015/058953, filed Apr. 24, 2015, which claims priority to German Patent Application No. DE 10 2014 107 292.8 filed May 23, 2014, the entire contents of both of which are incorporated herein by reference.

FIELD

The present disclosure relates to steering columns and steering columns that employ steering column jackets.

BACKGROUND

Steering columns for motor vehicles, in which the steering spindle is accommodated rotatably in a bearing, customarily in a rolling bearing, in a steering column jacket, are known. The steering spindle serves to transmit a steering torque from a steering wheel attached to the steering spindle to a wheel to be steered. The steering column jacket is customarily connected here via a retaining unit to the chassis of the motor vehicle. In order to be able to adapt the steering wheel to the respective sitting position of a driver, it is furthermore known to be able to pivot the steering column jacket for height adjustment at its end facing the driver and to provide a longitudinal adjustment.

In order to rotatably retain the steering spindle in the steering column jacket, rolling bearings in which the steering spindle is accommodated so as to be rotatable about the axis of rotation are customarily retained in the steering column jacket. It is desirable in this connection for the steering spindle to have high axial rigidity with respect to the steering column jacket in order to ensure that neither the spindle nor the bearing are displaced in the steering column jacket in the event of a crash or in the event of a high degree of stressing of the steering wheel by the driver.

In principle, it is known from the prior art, for example from DIN 472, to provide securing rings for axially securing rolling bearings in housings. A disadvantage of such a securing by means of a securing ring is the necessity of the additional component in the form of the securing ring and a necessary machining of the steering column jacket in order to form the required securing ring groove.

CN 2009 77 941 Y discloses a securing of a rolling bearing in a steering column jacket by means of tabs extending in the direction of the axis of rotation, wherein the tabs are then bent over in order to secure the bearing. In order in this manner to achieve a play-free securing of the bearing, high tolerance requirements are imposed on the formation of the punched-out portions for the tabs and on the dimensional stability of the width of the bearing.

U.S. Pat. No. 6,474,875 B1 discloses a bearing device in which tabs which are part of the jacket tube are provided for engagement in a groove in the outer ring of the bearing, wherein the tabs are bent into the groove in order to retain the rolling bearing. For this purpose, it is necessary to provide the rolling bearing with a circumferential groove.

DETAILED DESCRIPTION

Figure 1:
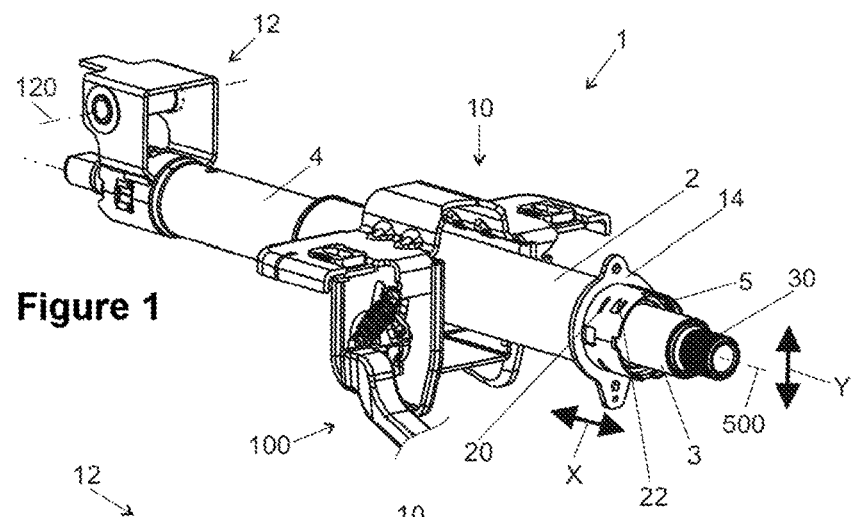
FIG. 1 is a schematic perspective view of an example steering column for a motor vehicle.
Figure 2:
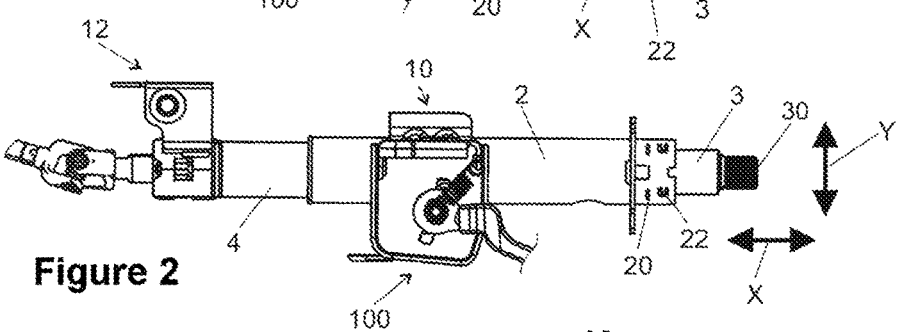
FIG. 2 is a schematic side view of the steering column of FIG. 1.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element. Similarly, it should be understood that the steps of any method claims need not necessarily be performed in the order in which they are recited, unless so required by the context of the claims.

Starting from the known prior art, it is an object of the present invention to specify a steering column for a motor vehicle, in which a seat of the bearing with a high degree of axial rigidity can be achieved with a simple design of the steering column.

Thus, in some examples, a steering column may include a steering column jacket comprising a jacket surface with a retaining segment, wherein the retaining segment at least partially surrounds a bearing for the rotatable mounting of a steering spindle about an axis of rotation. The retaining segment may have at least one tab that forms part of the steering column jacket and secures the bearing in the steering column jacket in the direction of the axis of rotation.

Accordingly, a steering column for a motor vehicle, comprising a steering column jacket is proposed, wherein the steering column jacket comprises a jacket surface having a retaining segment, wherein the retaining segment at least partially surrounds a bearing for the rotatable mounting of a steering spindle about an axis of rotation, and wherein the retaining segment has at least one tab which secures the bearing in the steering column jacket in the direction of the axis of rotation. According to the invention, the tab is connected to the retaining segment of the steering column jacket along a bending edge, wherein the bending edge encloses a projection angle of at maximum 45° with a projected axis of rotation, and wherein the free end of the tab is bent around the bending edge in the direction toward the axis of rotation.

The axis of rotation is projected along a projection direction onto the bending edge, as a result of which the projected axis of rotation is formed and the latter is brought into contact with the bending edge at least at one point. The projection direction is directed radially outward from the axis of rotation toward the bending edge, wherein the axis of rotation projects radially outward along said projection direction until the projected axis of rotation is in contact with the bending edge.

However, in order to improve the operation, a projection angle of less than 30° is preferred. A projection angle of less than 5° is particularly preferred. An orientation of the bending edge parallel to the axis of rotation, which corresponds to an angle of projection of 0°, is particularly preferred. In this sense, a "substantially parallel" orientation of the bending edge with respect to the axis of rotation should be understood, namely a deviation of less than 5° with respect to the exact parallelism.

Within the meaning of polar coordinates, the direction which surrounds the bearing and the axis of rotation can be understood as the circumferential direction. In this context, the tab extends in the circumferential direction into the interior (=in the direction of the axis of rotation). For simpler illustration, the further discussion is therefore simply only of an extent in the circumferential direction, but this correspondingly means that the tab is connected to the retaining segment of the steering column jacket along a bending edge, wherein the free end of the tab is bent around the bending edge in the direction of the axis of rotation and the bending edge is oriented substantially parallel to the axis of rotation.

Owing to the fact that the tab extends with its free end in the direction of the axis of rotation of the steering column, it is possible to achieve a fixing of the bearing in the steering column jacket, in which the tolerance requirements imposed on the individual components are reduced and which nevertheless permits a play-free seat of the bearing and provides a high degree of axial rigidity.

In particular, by means of the formation of the tab in the circumferential direction of the steering column jacket, the rigidity in the axial direction is higher compared to an identically dimensioned tab which extends in the direction of the axis of rotation. This is the case since, in the proposed design, the applied axial forces are applied to the plane of the tab and essentially no force components which would bring about a further deformation of the tab are present.

The application of the axial force to the plane of the tab should be understood as meaning that the axial force is applied to that side of the tab which faces the bearing via an end surface of the tab which faces the bearing and is indirectly or directly in contact with said bearing. By contrast, when the tab is oriented in the direction of the axis of rotation, the applied axial forces directly bring about a further deformation of the tab. In the case of the tab according to the invention, by contrast, despite the tab being bent over in the circumferential direction in order to retain the bearing when an axial force is applied in the direction of rotation of the bearing, the force is applied to the plane of the tab and not perpendicularly thereto. Accordingly, no further bending torques arise here for further bending the tab which is in any case already bent.

Since the bending edge about which the tab is deformed in order to lock the bearing in the steering column jacket is oriented substantially parallel to the axis of rotation, an axial force is applied in the direction of the axis of rotation parallel to the bending edge such that additional bending torques do not occur about said bending edge.

Accordingly, in this manner, given an identical dimensioning of the tab and in accordance with an identical weakening of the steering column jacket by the introduction of the tab, a higher degree of axial rigidity of the mounting of the bearing can be achieved.

A tab is understood as meaning a structure which is connected to the steering column jacket, comprises at least two free sides and is connected to the steering column jacket on a third side. The tab can therefore be deformed about the side connected to the steering column jacket, which side also forms the bending edge, in such a manner that a structure is produced which rises above the surrounding material of the steering column jacket and serves as a retaining anchor or as a retaining lug for retaining the bearing in the steering column jacket. However, the tab may also have any other polygonal shape, even with rounded corners, as long as it can be deformed about a side connected to the steering column jacket in order to retain the bearing.

The circumferential direction of the steering column tab can be represented by a section in a plane lying perpendicularly to the axis of extent of the steering column jacket, wherein the circumferential direction then extends around the steering column jacket along said section. The axis of extent of the steering column jacket customarily coincides with the axis of rotation and the longitudinal axis of the steering spindle. Since the steering column jacket preferably has a round cross section at least in the region of the mount of the bearing, the circumferential direction is correspondingly the direction extending in the direction of the circumference of the round cross section, except for the molding of the free end of the tab in the direction of the axis of rotation.

The tab is preferably connected integrally to the steering column jacket via a bending edge and the bending edge extends substantially parallel to the axis of rotation. Accordingly, the tab can be deformed around the bending edge in order to retain the bearing. Since the bending edge extends parallel to the axis of rotation, it is possible, as already explained above, for increased rigidity of the mounting of the bearing in the axial direction to be achieved since axial forces are applied parallel to the bending edge and force components perpendicular to the bending edge, which force components could lead to further deformation of the tab in the original bending direction shape, occur only to a very limited extent, if at all.

The tab preferably has a bevel on its side facing the bearing. The side facing the bearing is therefore not formed exactly in the circumferential direction of the bearing, but rather is beveled with respect thereto. Accordingly, the bearing can be fixed during the deformation of the tab by the wedge effect applied by means of the bevel without particularly high requirements having to be imposed for this purpose on the dimensional stability or the manufacturing tolerances of the bearing. The bevel is particularly preferably designed in such a manner that a predetermined tolerance in the width of the bearing and/or a tolerance in the design of the tab can be compensated for.

The bevel is particularly preferably oriented at an angle of inclination within the range of 45° to 85°. Angles of inclination within the range of 60° to 75° are preferred. The angle of inclination stretches into the plane of projection between the projection of the axis of rotation and the projection of the bevel of the tab. As seen in the circumferential direction the angle of the bevel is correspondingly within the range of 5° to 45°, wherein an angular range of 15° to 30° is preferred.

It can thus be achieved that as wide a tolerance range as possible can be covered and at the same time an application of axial forces substantially parallel to the bending edge and therefore high axial rigidity can be achieved.

In an advantageous embodiment, the tab is of substantially triangular design, wherein the base of the triangle is formed by a bending edge which is connected integrally to the steering column jacket, and that side of the tab which faces the bearing is beveled, and a free side extends in the circumferential direction of the steering column jacket or is likewise beveled, wherein the tab preferably forms the shape of a flat triangle. The point of the triangle is preferably rounded here. By means of such a simple shape of the tab, a stiff seat of the bearing is achieved with simple production capability and good compensation of tolerances.

The tab is preferably bent under force control around the bending edge in order to retain the bearing in the steering column jacket with a predetermined pretensioning force.

Furthermore, a bearing shoulder is preferably formed for placing the bearing in the steering column jacket and the tab is deformed in such a manner that the bearing is pretensioned against the bearing shoulder with a predetermined pretensioning force.

In order to be able to achieve a secure installation of the bearing and at the same time in order to be able to apply a predetermined pretensioning force to the bearing, it is proposed as the method for mounting a steering column for a motor vehicle according to one of the above-described embodiments to bend over the tab under force control in such a manner that the bearing is retained in the steering column jacket with a predetermined pretensioning force.

With reference now to the figures, similar or identically acting elements in the various figures are denoted here by identical reference signs. Further, as those having ordinary skill in the art will understand, a repeated description of said elements is partially omitted in the description below in order to avoid redundancies.

FIGS. 1 to 8 show a steering column 1 in a first exemplary embodiment. The steering column 1 has a steering column jacket 2 which is fixable to the chassis of a motor vehicle via an installation unit 10 and a supporting unit 12.

A steering spindle 3 which has a steering-wheel-side end 30 for connection to a steering wheel is mounted in the steering column jacket 2 so as to be rotatable in a bearing 5 (indicated schematically) about the axis of rotation 500. The steering spindle 3 serves for transmitting a steering wheel torque from the steering-wheel-side end 30 of the steering spindle 3 to downstream components of the steering train in order thereby to transmit the steering order introduced by a driver via a steering wheel exclusively to the motor vehicle wheels to be steered.

In the exemplary embodiment shown, the bearing 5 is designed as a rolling bearing, namely as a ball bearing. The bearing 5 accordingly has a bearing inner ring 52 and a bearing outer ring 50 which is rotatable about an axis of rotation 500 in relation to said bearing inner ring. Rolling bodies 54 are provided between the bearing outer ring 50 and the bearing inner ring 52 in the form of ball bearing balls which are guided in a cage 56 and which, together with the bearing outer ring 50 and the bearing inner ring 52, form the bearing 5 in the form of a ball bearing.

The steering column jacket 2 can be pivoted in a known manner about a pivot axis 120 in order to adjust the position of the steering column jacket 2 in the vertical direction Y. In order to be able to bring about the pivoting, a locking unit 100, which is known in principle from the prior art, has to be moved into its opening position. By means of the pivoting of the steering column jacket, the steering spindle 3 and in particular the steering-wheel-side end 30 of the steering spindle 3 can be positioned in order to move the steering wheel, which is held at the steering-wheel-side end 30 of the steering spindle 3, into an optimum position for the driver of the particular motor vehicle.

Furthermore, after release of the locking of the locking unit 100, the steering column jacket 2 can also be adjusted in the longitudinal direction X in order likewise to adapt the steering-wheel-side end 30 of the steering spindle 3 to the respective ergonomic needs of a driver. Mechanisms for the height adjustment or longitudinal adjustment and for the opening and locking of a locking unit 100 of an adjustable steering column 1 are well known from the prior art.

The steering column jacket 2 and the steering spindle 3 can be extended telescopically in order to adjust the steering column 1 longitudinally with respect to a rear steering column jacket 4 and with respect to a rear part (not shown here) of the steering spindle. In addition to the suitability for the longitudinal adjustment, the telescopic extendibility also serves in the event of a crash to enable the steering wheel to deflect back when the driver strikes thereagainst. The telescopic extendibility of steering columns is known in principle from the prior art.

A flange 14 for holding functional units of the steering wheel, for example for holding a basic unit of steering column switches or steering column operating elements, such as, for example, direction indicators, high beam switches or windshield wiper switches, is provided on the steering column jacket 2.

In the exemplary embodiment shown, the steering column jacket 2 is of tubular design and accordingly has a round cross section in a plane perpendicular to the tube axis.

Figure 3:
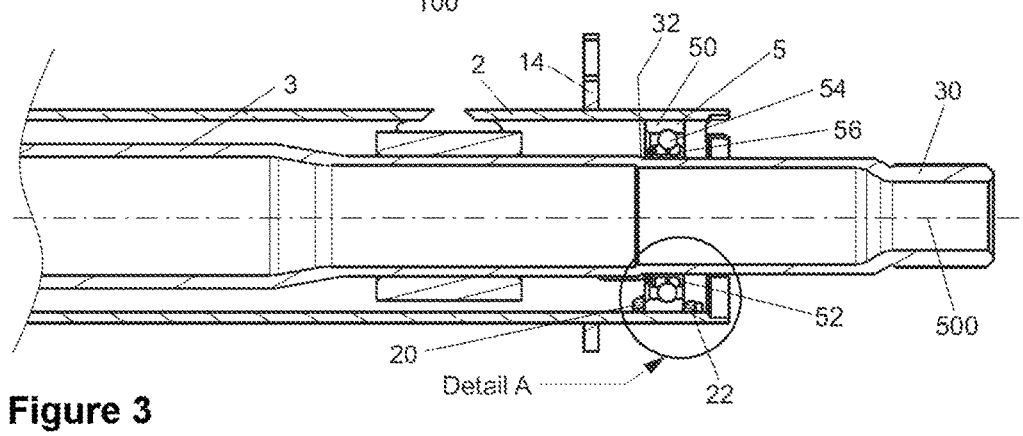
FIG. 3 is a schematic sectional view through regions of the steering column of FIGS. 1-2.
Figure 4:
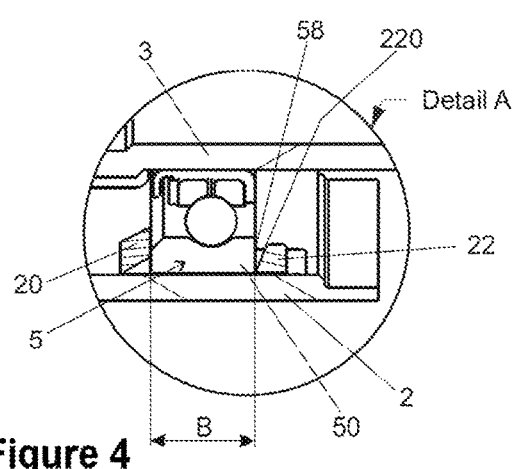
FIG. 4 is a detail view of the sectional view of the steering column of FIG. 3.

As can be seen particularly readily from the sectional illustration of FIG. 3, the bearing 5 is arranged between the steering column jacket 2 and the steering spindle 3. The bearing outer ring 50 is in direct contact here with the inner surface of the steering column jacket 2. The bearing inner ring 52 is in direct contact with the outer side of the steering spindle 3, wherein the bearing inner ring 52 also lies against a shoulder 32 of the steering spindle.

The bearing 5 lies in the axial direction at its bearing outer ring 5 in the steering column jacket 2 against a bearing shoulder 20. In the exemplary embodiment shown, the bearing shoulder 20 is formed by punching out and deforming the punched-free material of the steering column jacket 2, wherein the material of the steering column jacket 2 has been deformed inward into the steering column jacket. However, a bearing shoulder 20 for the bearing outer ring 5 to lie against in the axial direction can also be provided in a different manner, for example by formation of discontinuity in the diameter of the steering column jacket 2, a welded-on part or in another known manner.

On an end side 58 of the bearing outer ring 50, which end side faces the steering-wheel-side end 30 of the steering spindle 3, the bearing is retained in the steering column jacket 2 by means of a tab 22. The tab 22 is punched out of the material of the steering column jacket 2 and the material punched free in this manner is deformed inward into the steering column jacket 2 in order to secure and hold the bearing 5 at its bearing outer ring 50. The tab 22 is accordingly composed of the material of the steering column jacket 2 and is also connected integrally to the steering column jacket 2. In other words, the tab 22 is not completely separated from the steering column jacket 2 by the punching-out operation, but rather remains connected thereto.

The tab 22 first of all extends substantially in the circumferential direction of the tubularly designed steering column jacket 2 and therefore also in the circumferential direction of the bearing 5 and is deformed inward from this position into the steering column jacket 2 in order to retain the bearing 5 in its position pressed against the bearing shoulder 20.

Figure 14:
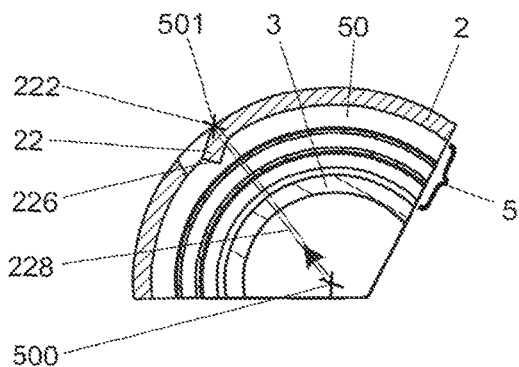
FIG. 14 is a schematic partial cross-sectional view of the steering column jacket with a deformed tab, in accordance with FIG. 1.

FIG. 14 shows a schematic partial cross section of the steering column jacket 2 in the region of the retaining segment. The steering spindle 3 is mounted in the steering column jacket 2 so as to be rotatable in the bearing 5 about the axis of rotation 500. The bearing 5 comprises the bearing outer ring 50 which is accommodated in the steering column jacket 2. The steering column jacket 2 comprises the tab 22, wherein said tab 22 is connected to the retaining segment of the steering column jacket 2 along the bending edge 222 and has the free end 226. Said free end 226 of the tab 22 is bent around the bending edge 222 in the direction of the axis of rotation 500 and secures the bearing outer ring 50, and therefore the bearing 5, against a possible displacement in a direction of the axis of rotation 500.

The axis of rotation 500 is projected along the projection direction 228 onto the bending edge 222, as a result of which the projected axis of rotation 501 is formed and the latter is brought into contact with the bending edge 222. The projection direction 228 is directed radially outward from the axis of rotation 500 to the bending edge 222, wherein the projection of the axis of rotation 500 along said projection direction 228 takes place radially outward until the projected axis of rotation 501 is in contact with the bending edge 222 at least at one point.

Figure 9:
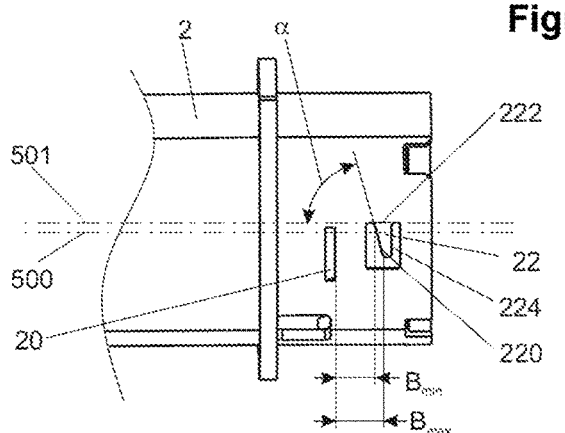
FIG. 9 is a schematic side view of another example steering column jacket.

FIGS. 9 and 14 show the projected axis of rotation 501 which is projected onto the bending edge 222 from the axis of rotation 500 along the projection direction 228. The projected axis of rotation 501 coincides directly with the bending edge 222, and therefore the bending edge 222 and the projected axis of rotation 501 meet at infinitely many points and are therefore parallel, wherein the projection angle β has a value of 0° because of the parallelism.

Figure 5:
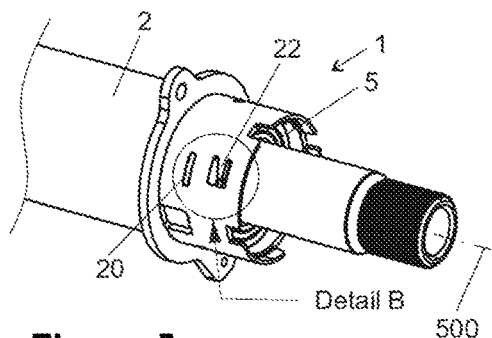
FIG. 5 is a schematic perspective view of the steering column jacket of the preceding figures with a tab in a non-deformed pre-installation position.
Figure 6:
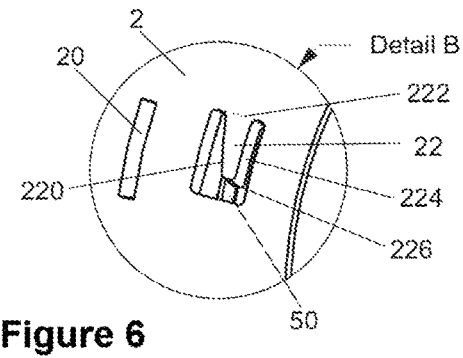
FIG. 6 is a detail view of the tab in the steering column jacket of FIG. 5.
Figure 7:
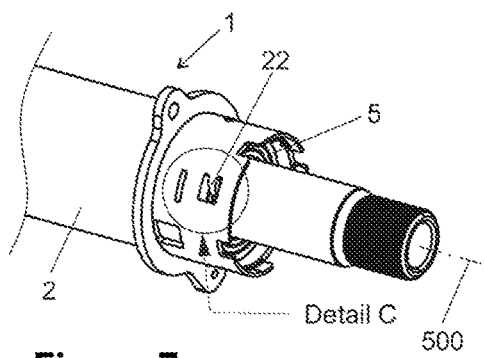
FIG. 7 is a perspective view of the steering column jacket of FIGS. 5 and 6 with a deformed tab in a mounted position.
Figure 8:
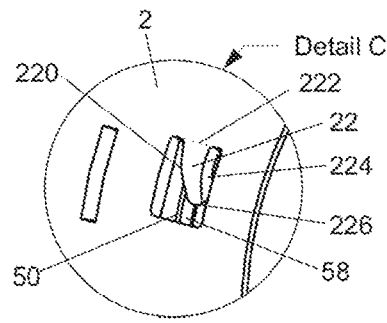
FIG. 8 is a detail view of the tab of FIG. 7.

Two different states of the steering column jacket 2 are shown schematically in FIGS. 5 to 8, namely a preinstallation state in which the tab 22 is not yet bent over in order to hold the bearing 5, in FIGS. 5 and 6, and, in FIGS. 7 and 8, a state of the steering column jacket 2, in which the tab 22 is already completely bent over in order to press the bearing 5 with a defined prestress against the bearing shoulder 20 and therefore to retain said bearing fixedly in the steering column jacket 2.

The tab 22 can be seen in detail in a non-deformed preinstallation state in FIGS. 5 and 6. Since the tab 22 has been made from the material of the steering column jacket 2, the tab is designed as part of the steering column jacket 2 and is connected to the rest of the steering column jacket 2 along a bending edge 222. The bending edge 222 extends substantially parallel to the axis of rotation 500. By contrast, the tab 22 extends substantially in the circumferential direction of the tubular steering column jacket 2 and therefore also in the circumferential direction of the bearing outer ring 50 of the bearing 5 accommodated in the steering column jacket 2.

As also emerges from the figures, the tab 22 has a bevel on its side 220 facing the bearing 5 in order, when the tab 22 is deformed by the application of a wedge effect caused by the bevel, to apply a defined contact pressure force against the outer ring 50 of the bearing 5. Owing to the fact that the bevel is provided on that side 220 of the tab 22 which faces the bearing 5, tolerances occurring in the width B of the outer ring 50 of the bearing 5 can also be absorbed, and therefore exacting requirements do not have to be imposed on the tolerance compliance of the width B of the bearing 5. Accordingly, the bearing 5 can be selected so as to be cost-effective.

Furthermore, the requirements imposed on the positioning accuracy of the punched-out points for forming the bearing shoulder 20 and the tab 22 can also be reduced in this manner since possible tolerances can also be compensated for here by the beveling of that side 220 of the tab 22 which faces the bearing 5. All in all, the manufacturing and installation of the steering column 1 can thereby be simplified.

As can also be seen schematically from FIG. 9, that side 220 of the tab 22 which faces the bearing 5 is formed in the non-deformed state at an angle of inclination a with respect to the projected axis of rotation 501, wherein said projected axis of rotation 501 is projected radially outward onto the bending edge 222 from the axis of rotation 500. The angle of inclination a is typically within the range of 45° to 85° and preferably within the range of 60° to 75°. By means of the specified angular ranges, a wedge effect can be applied to compensate for the tolerances, wherein forces applied to the bearing 5 along the axis of rotation 500 are simultaneously introduced substantially in one direction into the tab 22 which is substantially parallel to the bending edge 222 formed after the bending. Axial forces applied to the bearing 5 therefore do not bring about any additional deformation of the tab 22 about the bending edge 222, and therefore a high degree of axial rigidity can be achieved.

In the exemplary embodiment shown, a free side 224 for defining the punched-out tab 22 is furthermore provided. The beveled side 220 facing the bearing 5, and the free side 224 are brought into contact in such a manner that the tab 22 schematically forms a triangular shape. However, the tab 22 may also have any other shape and, for example, a rectangular or square basic shape can also be formed between the bending edge 222 and the remaining sides of the tab 22. However, as described above, the side 220 facing the bearing 5 is preferably beveled in order to provide the above-described compensation of tolerances. The basic shape of the tab 22 is therefore preferably triangular or polygonal with at least one beveled side 220 facing the bearing 5.

FIGS. 7 and 8 show the steering column 1 in a state in which the tab 22 is deformed in such a manner that it is bent inward around its bending edge 222 into the steering column jacket 2. The general orientation of the tab 22 remains here in the circumferential direction of the steering column jacket 2 or of the bearing 5. The bending edge 222 about which the tab 22 has been deformed extends substantially parallel to the axis of rotation 500.

A predetermined contact pressure force or pretensioning of the bearing 5 against the bearing shoulder 20 when the tab 22 is deformed can be achieved by means of a force-controlled deformation of the tab 22 on account of the beveled side 220 of the tab 22, which side faces the bearing 5. By the application of a correspondingly controlled force for deforming the tab 22, a predetermined contact pressure force or pretensioning can be achieved irrespective of the tolerances present in each case.

It can be seen particularly in FIG. 8 that that side 220 of the tab 22 which faces the bearing 5 lies against the bearing outer ring 50 and in particular against the end side 58 of the bearing outer ring 50. Since that side 220 of the tab 22 which faces the bearing is beveled, the tab 22 always comes into contact with the end side 58 of the bearing outer ring 50 of the bearing 5 within a predetermined range of tolerances and, in the event of a force-controlled deformation of the tab 22, exerts a pretensioning force on the bearing 5 in the axial direction, i.e. in the direction of the axis of rotation 500.

In a variant (not shown), the tab 22 can also engage in a circumferential groove of the bearing 5.

Furthermore, in a further variant (not shown), the bearing shoulder 20 which supports the bearing in the axial direction is likewise realized by means of a tab according to the invention.

The function of the possible compensation for tolerances by means of the beveled tab 22 can be seen particularly readily from FIG. 9. A maximum width $B_{max}$ and a minimum width $B_{min}$ are indicated here for the width of the bearing outer ring 50—in each case starting from the bearing shoulder 20. The range of tolerances, formed between $B_{max}$ and $B_{min}$, of the bearing 5 can be correspondingly compensated for by the beveled side 220 facing the bearing 5.

Owing to the fact that the tab 22 extends in the circumferential direction of the steering column jacket 2 and the bending edge 222 of the tab 22 extends substantially parallel to the axis of rotation 500, forces in the direction of the axis of rotation 500 are substantially applied to the plane of the tab 22. The axial forces correspondingly act on the tab 22 substantially parallel to the bending edge 222, and therefore additional bending torques for further deformation of the tab 22 are not applied. On the contrary, the axial forces are removed in the plane of the tab, and therefore no additional deformation of the tab 22 occurs and accordingly an increased rigidity of the connection of the tab 5 to the steering column jacket 2 is achieved.

For comparison and for illustration, in the case of a tab, the bending edge of which extends substantially perpendicularly to the axis of rotation, any axial forces would apply additional bending torques to the tab, which bending torques could correspondingly result in further deformation of the tab and therefore in a reduction in the respective retaining forces.

Accordingly, by means of the above-described tab 22, a connection of the bearing 5 to the steering column jacket 2 can be achieved, which connection has a high degree of axial rigidity and at the same time permits a play-free seat of the bearing 5 with reduced tolerance requirements imposed on the bearing 5 and on the positioning of the bearing shoulder 20 and of the tab 22 in the steering column jacket 2. Furthermore, additional parts for the connection of the bearing 5 to the steering column jacket 2 are avoided by forming the tab 22 from the material of the steering column jacket 2.

Figure 10:
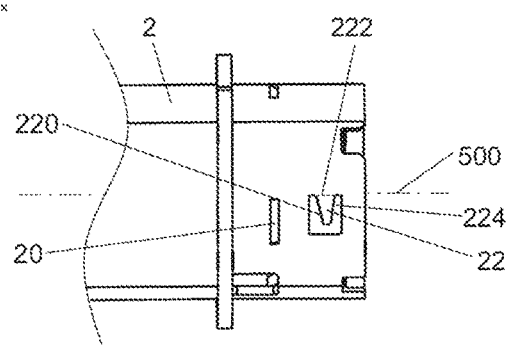
FIG. 10 is a schematic side view of still another example steering column jacket.

FIG. 10 shows a further schematic illustration of part of a steering column in a side view of the steering column jacket 2. The tab 22 in turn has a side 220 which faces the bearing 5 and is beveled. In the exemplary embodiment shown, the free side 224 is likewise beveled in relation to the circumferential direction, and therefore the tab 22 substantially forms an equiangular triangle with the base at the bending edge 222. Other triangular shapes of the tab 22 are also conceivable as long as the general orientation of the non-deformed tab 22 lies in the circumferential direction of the steering column jacket 2 or in the circumferential direction of the bearing 5, and a bending edge 222 is formed substantially parallel to the axis of rotation 500.

Figure 11:
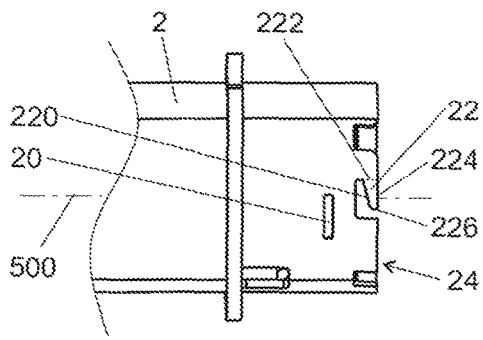
FIG. 11 is a schematic side view of an example steering column jacket.

FIG. 11 shows a further possibility for forming the tab 22, wherein the tab 22 here in turn comprises a bending edge 22 extending parallel to the axis of rotation 500, and the side 220 facing the bearing is beveled. The free side 224 coincides here with the end side 24 of the steering column jacket 2.

Figure 12:
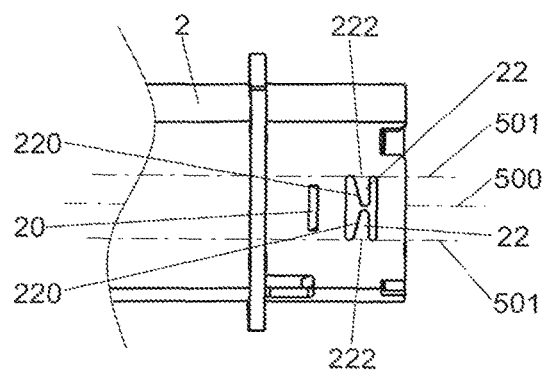
FIG. 12 is a schematic side view of yet another example steering column jacket.

FIG. 12 shows a further formation of the tab 22, wherein two opposite tabs 22 are provided here which both extend substantially in the circumferential direction of the steering column jacket 2 and which are present in a common punched recess. The two projected axes of rotation 501 are projected radially outward from the axis of rotation 500 onto the respective bending edge 222 of the corresponding tab 22. The respective axis of rotation 501 comes into contact here with its bending edge 222 assigned by means of the projection. In the variant embodiment illustrated here, the respective bending edge 222 and the projected axis of rotation 501 assigned thereto come into contact at infinitely many points and are therefore parallel, wherein the angle of projection 13 has a value of 0° because of the parallelism.

The two tabs 22 can be bent over in such a manner that their respective sides 220 which face the bearing 5 and are in turn beveled both provide compensation for tolerances and also provide a defined pretensioning force when they are bent over under force control.

Figure 13:
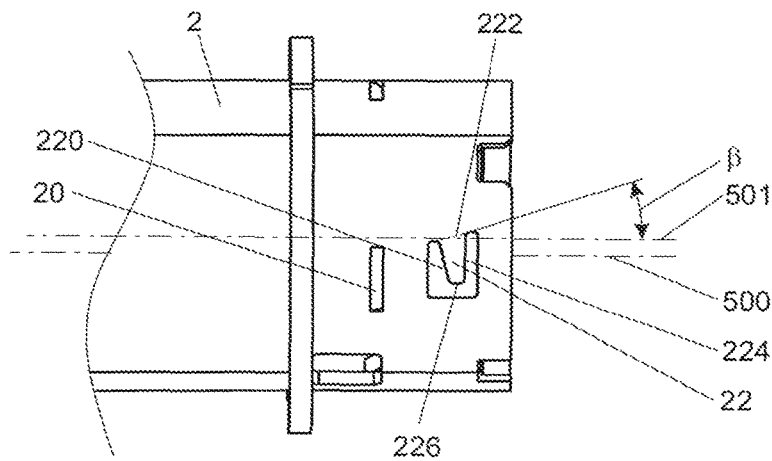
FIG. 13 is a schematic side view of an example steering column jacket.

FIG. 13 shows a schematic illustration of part of a steering column in a side view of the steering column jacket 2. The steering column jacket 2 has the tab 22, wherein said tab 22 is connected to the retaining segment of the steering column jacket 2 along the bending edge 222 and has the free end 226. Furthermore, the tab 22 comprises a side 220 facing the bearing 5, and the free side 224. The projected axis of rotation 501 is projected radially outward from the axis of rotation 500 onto the bending edge 222. The axis of rotation 501 comes into contact here with the bending edge 222 precisely at one point since the bending line 222 is arranged at a projection angle β with a value of greater than 0° with respect to the projected axis of rotation 501. In the example, the projection angle β between the bending edge 222 and the projected axis of rotation 501 is 15°.

To the extent applicable, all individual features which are illustrated in the individual exemplary embodiments can be combined with one another and/or interchanged without departing from the scope of the invention.

What is claimed is:

1. A steering column for a motor vehicle, the steering column comprising a steering column jacket with a jacket surface having a retaining segment, wherein the retaining segment at least partially surrounds a bearing for rotatably mounting a steering spindle about an axis of rotation, wherein the retaining segment includes a tab that secures the bearing in the steering column jacket in a direction of the axis of rotation, the tab being connected to the retaining segment of the steering column jacket along a bending edge and having a bevel disposed on a side of the tab that faces the bearing, wherein a projection angle between the bending edge and a projected axis of rotation is at most 45°, wherein a free end of the tab is bent around the bending edge toward the axis of rotation.

2. The steering column of claim 1 wherein the tab and the retaining segment are comprised of a formed sheet metal part.

3. The steering column of claim 1 wherein the bevel is configured to compensate for at least one of a predetermined tolerance in a width of the bearing or a tolerance in the tab.

4. The steering column of claim 1 wherein the bevel compensates for manufacturing variability in at least one of the bearing or the tab.

5. The steering column of claim 1 wherein the side of the tab facing the bearing forms an angle of inclination with the projected axis of rotation within a range of 45° to 85°.

6. The steering column of claim 1 wherein a shape of the tab is substantially triangular, wherein a base of the tab is formed by the bending edge, wherein a side of the tab facing the bearing is beveled, wherein a side of the tab facing away from the bearing is beveled or extends in a circumferential direction of the steering column jacket.

7. The steering column of claim 6 wherein the tab is flat.

8. The steering column of claim 1 wherein the tab is bent under force control around the bending edge to retain the bearing in the steering column jacket with a predetermined pretensioning force.

9. The steering column of claim 1 further comprising a bearing shoulder for positioning the bearing in the steering column jacket, wherein the tab is deformed such that the bearing is pretensioned against the bearing shoulder with a predetermined pretensioning force.

10. The steering column of claim 1 wherein the projected axis of rotation is parallel to the axis of rotation and is positioned radially outwards of the axis of rotation.

11. A steering column for a motor vehicle, the steering column comprising:
a bearing;
a steering column jacket with a jacket surface having a retaining segment, wherein the retaining segment at least partially surrounds the bearing for rotatably mounting a steering spindle about an axis of rotation; and
a tab that is disposed on the retaining segment and secures the bearing in the steering column jacket in a direction of the axis of rotation, the tab being connected to the retaining segment along a bending edge and having a bevel disposed on a side of the tab that faces the bearing, wherein a projection angle between the bending edge and a projected axis of rotation is at most 45°, wherein the tab is bendable inward from the bending edge.

12. The steering column of claim 11 wherein a side of the tab facing the bearing forms an angle of inclination with the projected axis of rotation within a range of 45° to 85°.

13. The steering column of claim 11 wherein a shape of the tab is substantially triangular.

14. The steering column of claim 11 wherein the tab is flat.

15. The steering column of claim 11 wherein the tab retains the bearing in the steering column jacket by applying a predetermined amount of force against the bearing.

16. The steering column of claim 11 wherein the tab is a first tab, the steering column further comprising a second tab that is disposed on the retaining segment and secures the bearing in the steering column jacket in the direction of the axis of rotation, the second tab being connected to the retaining segment along a second bending edge, wherein a projection angle between the second bending edge and a projected axis of rotation is at most 45°, wherein the second tab is bendable inward from the second bending edge.

* * * * *